(No Model.)
T. A. EDISON.
REGULATOR FOR DYNAMO ELECTRIC MACHINES.
No. 265,782.          Patented Oct. 10, 1882.
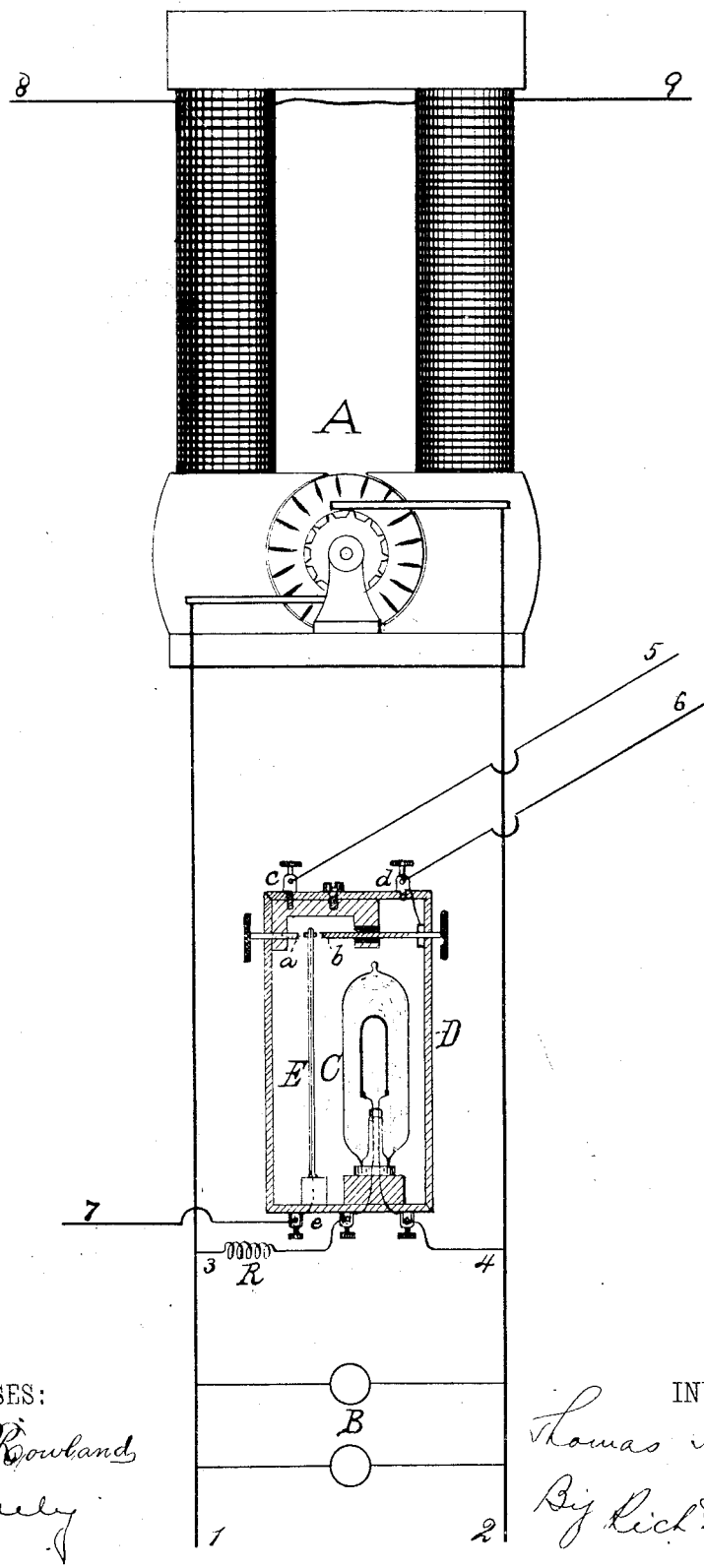
WITNESSES:
E. C. Rowland
H. W. Seely
INVENTOR:
Thomas A. Edison
By Rich'd N. Dyer
Atty.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 265,782, dated October 10, 1882.

Application filed August 14, 1882. (No model.)

*To all whom it may concern:*

Be it known that I, THOMAS A. EDISON, of Menlo Park, in the county of Middlesex and State of New Jersey, have invented a new and useful Improvement in Means for Regulating Electrical Generators, (Case No. 460;) and I do hereby declare that the following is a full and exact description of the same, reference being had to the accompanying drawing, and to the letters of reference marked thereon.

The object of the present invention is to produce means for controlling electrical mechanism, regulating the generative capacity of dynamo or magneto electric machines, which means will be simple in construction and efficient in operation, and will be affected exactly as are the lamps, motors, or other translating devices, by changes in the speed of the engine, as well as by changes in the number of translating devices in circuit.

The object is more especially to control dynamo or magneto electric machines supplying translating devices located in separate multiple-arc circuits and independently controllable.

The object is accomplished by utilizing for the purpose the heating effect of the current, the current of a multiple-arc circuit being employed, so that the controlling devices will be affected exactly the same as the translating devices of the system by changes in speed of engine, as well as in number of translating devices. The preferred form of the controlling device is an incandescing electric lamp or other form of heating-resistance, which is located in a multiple-arc circuit, with or without extra resistance, and is inclosed within a suitable case in which is located a thermostatic device which closes the circuit to the operating mechanism. A compound spring may be employed, the free end of which, when the electro-motive force is normal, will stand centrally between two contact-points. These contact-points are connected with different branches of the circuit through the operating mechanism, while the thermostatic spring is also in the circuit of the operating mechanism. Now, if there is a drop in the electro-motive force, the lamp will be affected and the spring will make one contact and complete a circuit through the operating mechanism, causing the same to operate and adjust the generator for greater electro-motive force, while if there is a definite increase in the electro-motive force above the normal the thermostatic spring will make the other contact and complete another circuit through the operating mechanism, working it in the opposite direction and causing it to adjust the generator for a lower electro-motive force.

The operating mechanism may be an electro-magnetic mechanism arranged to throw resistance into and out of the field-circuit, as described in my application No. 375, (Serial No. 68,603;) or for adjusting the commutator-brushes, as described in my application No. 391, (Serial No. 68,614;) or for adjusting a circuit-breaker, as described in my application No. 461, (Serial No. 69,259,) or for regulating the generative capacity of the dynamo or magneto electric machine in any other way.

It is evident that in connection with the lamp or other heating-resistance a reflector may be used to concentrate the heat-rays upon the thermostatic spring; also, that the thermostatic spring, instead of being straight, may be coiled around the lamp; also, that the heat of the lamp or other form of heating-resistance may be used to work all known forms of expansion apparatus—such, for instance, as air or other gas working upon a diaphragm or on a mercury column or a mercury column affected directly by the heat.

The foregoing will be better understood by reference to the drawing, which is a view, partly diagrammatic, of the preferred form of the thermostatic controlling device.

A represents a dynamo or magneto electric machine, from which run the main conductors 1 2 in multiple-arc circuits, from which are the lamps, motors, or other translating devices B.

In a multiple-arc circuit, 3 4, with or without extra resistance R, is located an incandescing electric lamp, C, or any other form of heating-resistance, such as a wire or carbon resistance inclosed within a case, D. In this case is arranged a compound thermostatic spring, E, which normally stands between two adjustable screw-contacts, *a b*. These are connected with binding-posts *c d*, from which run the conductors 5 6.

The thermostatic spring is connected with a binding-post, *e*, from which runs another conductor, 7. These conductors 5, 6, and 7 may form parts of the circuits through an operating mechanism for throwing resistance into and out of the field-circuit, or for adjusting the commutator-brushes or adjusting a circuit-breaker, as described in my applications Nos. 375, 391, and 461, before referred to. The ends 8 9 of the coils of the field-magnet may be connected with the conductors 1 2, or the field-circuit may be supplied from an external source. When the electro-motive force is normal spring E will stand centrally between *a* and *b*, breaking both divisions of the circuit through the operating mechanism. Now, if the electromotive force increases, spring E will make one contact—say *a*—and a division of the circuit through the operating mechanism will be completed, causing it to work in one direction and adjust the machine for a lower electro-motive force. If the electro-motive force decreases below the normal electro-motive force, spring E will make contact *b*, and will complete the other division of the circuit through the operating mechanism, causing it to work in the opposite direction and adjust the machine for a higher electro-motive force.

What I claim is—

1. The combination, with a dynamo or magneto electric machine and translating devices arranged in multiple arc, of an electrical heating device arranged in mutiple arc, circuits for regulating the generator, and a switch controlled by such electrical heating device and closing such circuits at the limits of the normal condition of the current, substantially as set forth.

2. The combination, with a dynamo or magneto electric machine, of a lamp or other heating-resistance and a thermostatic or expansion device affected by the heat of the lamp and circuits closed thereby for controlling the regulation of the machine, substantially as set forth.

3. The combination, with a dynamo or magneto electric machine supplying translating devices in multiple arc, of a lamp or other heating-resistance arranged in multiple arc, and a thermostatic spring affected by the heat of the lamp or other resistance, and circuits closed at the front and back contacts of the spring for controlling the regulation of the machine, substantially as set forth.

This specification signed and witnessed this 7th day of July, 1882.

THOMAS A. EDISON.

Witnesses:
RICHD. N. DYER,
EDWARD H. PYATT.